Figure 1:
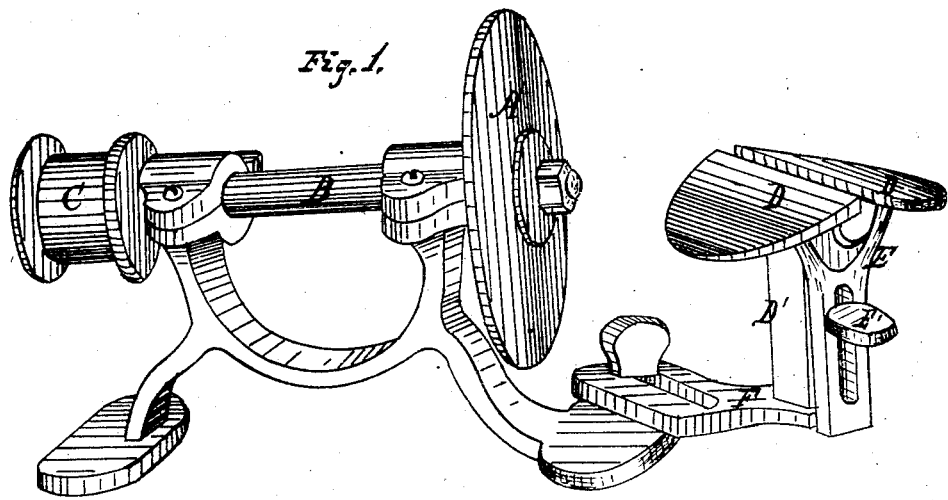

A. W. Newhall.
Sharpening & Gumming Saw.

Nº 76236      Patented Mar. 31, 1868.

Witnesses.             Inventor.

Chas. F. Clausen.       Abner W. Newhall
R. Mason.            by D. P. Holloway & Co.
                               his attys.

United States Patent Office.

ABNER W. NEWHALL, OF HORSE HEADS, NEW YORK.

Letters Patent No. 76,236, dated March 31, 1868.

IMPROVEMENT IN MACHINE FOR SHARPENING AND GUMMING SAWS.

*The Schedule referred to in these Letters Patent and making part of the same.*

TO ALL WHOM IT MAY CONCERN:

Be it known that I, ABNER W. NEWHALL, of Horse Heads, in the county of Chemung, and State of New York, have invented a new and useful Machine for Sharpening and Gumming Saws; and I do hereby declare that the following is a full, clear, and exact description of the same, reference being had to the annexed drawings, in which the machine is shown in perspective.

My improvement consists in combining with an emery-wheel a table for supporting the saw, which is constructed with two folding leaves, so adjustable as to be maintained at the same angle below the horizontal plane of the table.

In the annexed drawings, A is an emery-wheel, such as is in common use for grinding and gumming saws. It is hung on a mandrel, B, supported on a suitable frame, and driven by the pulley C. The saw in sharpening or gumming, is supported upon one of the folding leaves D D of the table. These leaves are semicircular, and hinged, as shown, to the top of the central post D'. The leaves rest respectively upon the points of the bifurcated support E, which is attached to the post D' by a set-screw, E', passing through a slot, or in other convenient manner. The table is attached to an adjustable arm, F, fastened by a set-screw passing through a slot to the saw-frame, in such manner that the table may be adjusted as may become necessary in relation to the saw. By raising or lowering the bifurcated support E, the leaves D D may be set at a greater or less angle to the horizontal plane of the table, and as the support will maintain them at the same angle, the saw being transferred from one to the other in grinding, it follows that the sides of the teeth will be cut at the same angle.

I am aware that an oscillating table has been used for this purpose. It, however, requires considerable care in adjusting it when reversed, in order to secure equal angles, and is correspondingly liable to produce inequalities in the angles, while by having two leaves on opposite sides, always maintained at equal angles, the grinding must be accurate.

I do not claim the table adjustable at an angle as my invention; but

What I do claim as my invention, and desire to secure by Letters Patent, is—

A table for supporting saws in being ground and gummed, constructed with two folding leaves D D, so adjustably supported by the bifurcated support E, as to maintain equal angles to the horizontal plane, substantially as and for the purpose set forth.

In testimony whereof, I have signed my name to this specification in the presence of two subscribing witnesses.

A. W. NEWHALL.

Witnesses:
    JOHN D. BLOOR,
    JOHN S. HOLLINGSHEAD.